MAGNESIUM TETRABORIDE

Aden J. King, Syracuse, N.Y., assignor, by mesne assignments, to Olin Mathieson Chemical Corporation, a corporation of Virginia

No Drawing. Application January 29, 1954
Serial No. 407,149

8 Claims. (Cl. 23—204)

My invention relates to magnesium tetraboride.

The magnesium tetraboride of my invention is a solid compound having the formula $MgB_4$. The compound is characterized by its insolubility in acids, e.g. hydrochloric acid, and by its characteristic X-ray diffraction pattern. From crystallographic analysis using X-ray techniques, I have determined that the unit cell of the compound is pseudo-hexagonal and contains 24 molecules. The cell constants are as follows: alpha=94° 13′, beta=92° 19′, gamma=122° 0′, $a_0=14.18$ angstrom units, $b_0=14.73$ angstrom units and $c_0=5.408$ angstrom units. The cell constants result in a polyhedron which very closely matches a hexagonal lattice. The slight deviations from the true hexagonal allow for the unit cell to be pseudo-hexagonal.

According to my invention, the magnesium tetraboride is prepared by heating magnesium and boron materials at a temperature between about 900 to 1200° C. in an inert atmosphere. By the term magnesium and boron materials, I mean either elemental magnesium and elemental boron, magnesium diboride ($MgB_2$) and elemental boron, or magnesium diboride alone. Thus, the magnesium tetraboride is prepared by heating metallic magnesium with elemental boron in an atomic ratio corresponding to that required by the composition $MgB_4$, by heating the compound magnesium diboride ($MgB_2$) with elemental boron in an atomic ratio to give $MgB_4$, or by heating magnesium diboride in vacuum for a sufficient period of time to vaporize one atomic weight of magnesium from two atomic weights of magnesium diboride. The magnesium tetraboride is recovered by acid extraction of the product of the reaction which contains magnesium tetraboride and magnesium diboride. The magnesium diboride is removed as a soluble magnesium salt and the insoluble solid magnesium tetraboride is recovered. Any acid which will produce a soluble magnesium salt with magnesium diboride is satisfactory. Such acids include, for example, hydrochloric, acetic, dilute sulfuric and dilute nitric acids.

In the method wherein elemental magnesium and elemental boron are reacted to obtain magnesium tetraboride, the reaction may progress in two steps according to Equations 1 and 2:

(1)  $Mg + 2B \rightarrow MgB_2$ (2) 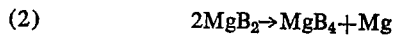 $2MgB_2 \rightarrow MgB_4 + Mg$ or the reaction may proceed directly according to Equation 3:

(3)  $Mg + 4B \rightarrow MgB_4$

The reaction shown in Equation 2 is reversible since when magnesium tetraboride is heated with one equivalent of metallic magnesium, the end product is completely soluble in acid and its X-ray diffraction pattern is that of magnesium diboride. The ratio of magnesium to boron used in the reaction may vary between slightly more boron that that theoretically required to give magnesium diboride to exactly that required to yield magnesium tetraboride. This method is particularly advantageous when it is desired that no excess free boron remain in the end product. When this is desired, the quantity of the magnesium should be in slight excess of that required by the formula $MgB_4$ or, conversely, the quantity of boron should be slightly less than that required to give $MgB_4$. For example, a ratio of boron to magnesium of about 3.75 to 1 is satisfactory. Under these conditions the boron will combine completely with magnesium to form a mixture of magnesium tetraboride and magnesium diboride. As the magnesium diboride is soluble in acid and magnesium tetraboride is insoluble, a sharp separation is attainable. The temperature of heating of the reactants may vary between about 900 to 1200° C., preferably about 1000 to 1200° C., depending upon the time of heating.

In the method wherein magnesium diboride is reacted with elemental boron to obtain magnesium tetraboride, the amount of boron in the reaction mixture may be varied from a fraction of an atomic equivalent to two mol equivalents per mol of magnesium diboride, but greater efficiency is obtained when the amount of boron is present in a quantity of about 1.75 mols of boron per mol of magnesium diboride. The temperature may vary between 900 and 1200° C., preferably about 1000 and 1200° C., depending upon the time of heating.

In the method wherein magnesium diboride is heated in vacuum to obtain magnesium tetraboride, the temperature may vary between about 900 and 1200° C., depending upon the time of heating of the magnesium diboride. The time of heating should be controlled so that the ratio of boron to magnesium in the product does not exceed 4 to 1. A higher purity product is obtained if heating is discontinued when the ratio is slightly lower than 4 to 1, for example 3.5 to 1.

The magnesium tetraboride of my invention is useful, for example, as a means for introducing boron into alloys used in tools and dies and, because of its extreme hardness, it is a valuable abrasive material.

My invention will be further illustrated by reference to the following examples.

Example I

As an example of the method by which magnesium tetraboride is prepared from the elements magnesium and boron, 1.082 grams of pure boron were thoroughly admixed with 0.811 gram of magnesium, that is, in an atomic ratio of 3:1, respectively. The mixture was formed into a briquette under pressure and the briquette was heated to 250° C. in a vacuum chamber. The vacuum was broken with helium and the briquette was heated to 1100° C. for 1 hour. The briquette then was allowed to cool to room temperature while still in the helium-filled vacuum furnace. An X-ray diffraction pattern showed the presence of both $MgB_2$ and $MgB_4$ in the product. The product was then extracted with hydrochloric acid, washed with hot water and dried. The residue weighed 1.120 grams. The X-ray diffraction pattern of the final product showed only the presence of $MgB_4$ and a chemical analysis agreed with this composition.

Example II

As an example of the preparation of magnesium tetraboride from magnesium diboride and boron, a mixture was prepared which contained 2.043 grams of magnesium diboride and 0.723 gram of pure boron, that is, in a ratio of one mol of magnesium diboride and 1.5 atomic equivalents of boron. The mixture was briquetted under pressure, heated to 250° C. in vacuum and then heated at atmospheric pressure in helium to 1100° C. After cooling in the reaction vessel to room temperature in an atmosphere of helium, the product was shown by its X-ray diffraction pattern to consist of a mixture of $MgB_2$ and $MgB_4$. After extraction with hydrochloric acid, washing and drying, the residue weighed 2.240 grams. The X-ray diffraction pattern showed only $MgB_4$.

*Example III*

As an example of the preparation of magnesium tetraboride by the decomposition of magnesium diboride, a briquette weighing 10 grams was pressed from pure magnesium diboride. The briquette was heated in vacuum at 950° for 1 hour to give sufficient time for the required amount of magnesium to vaporize out of the $MgB_2$ (slightly less than ½ atomic weight of magnesium per molecular weight of magnesium diboride). The vacuum was broken with helium and the briquette allowed to cool to room temperature in an atmosphere of helium. The X-ray diffraction pattern showed the product to consist of a mixture of $MgB_2$ and $MgB_4$. Analysis of the product showed that the product contained 80.2 percent $MgB_4$ and 19.8 percent $MgB_2$. After extraction with hydrochloric acid, washing and drying, the X-ray diffraction pattern and chemical analysis showed the product to consist entirely of $MgB_4$.

I claim:

1. Magnesium tetraboride having the formula $MgB_4$.

2. A method for preparing magnesium tetraboride having the formula $MgB_4$ which comprises reacting a material selected from the group consisting of elemental magnesium and magnesium diboride with elemental boron at a temperature of about 900 to 1200° C. in an inert atmosphere contacting the resulting reaction product with an acid selected from the group consisting of hydrochloric acid, acetic acid, dilute sulfuric acid, and dilute nitric acid, and recovering solid magnesium tetraboride.

3. A method for preparing magnesium tetraboride having the formula $MgB_4$ which comprises heating elemental magnesium and elemental boron at a temperature of about 900 to 1200° C. in an inert atmosphere contacting the resulting reaction product with an acid selected from the group consisting of hydrochloric acid, acetic acid, dilute sulfuric acid, and dilute nitric acid, and recovering solid magnesium tetraboride.

4. A method for preparing magnesium tetraboride having the formula $MgB_4$ which comprises heating magnesium diboride and elemental boron at a temperature of about 900 to 1200° C. in an inert atmosphere contacting the resulting reaction product with an acid selected from the group consisting of hydrochloric acid, acetic acid, dilute sulfuric acid, and dilute nitric acid, and recovering solid magnesium tetraboride.

5. A method for preparing magnesium tetraboride having the formula $MgB_4$ which comprises heating magnesium diboride in vacuum at a temperature of about 900 to 1200° C., cooling in an inert atmosphere contacting the resulting reaction product with an acid selected from the group consisting of hydrochloric acid, acetic acid, dilute sulfuric acid, and dilute nitric acid, and recovering solid magnesium tetraboride.

6. A method for separating magnesium tetraboride having the formula $MgB_4$ from magnesium diboride which comprises extracting a mixture of magnesium tetraboride and magnesium diboride with an acid selected from the group consisting of hydrochloric acid, acetic acid, dilute sulfuric acid and dilute nitric acid, and recovering solid magnesium tetraboride.

7. The method of claim 2 in which the acid is hydrochloric acid.

8. The method of claim 6 in which the acid is hydrochloric acid.

References Cited in the file of this patent

Travers et al.: "Proceedings of the Royal Society of London," Series A, vol. 87, page 178 (1912).

Russell et al.: "Acta Crystallographica," vol. 6, page 870 (November 10, 1953).

Roy: "Journal of the Chemical Society," vol. 105, pp. 2162–2168 (1914).